Aug. 14, 1956 N. W. PARKER 2,759,121
TELEVISION RECEIVER
Filed Aug. 10, 1953
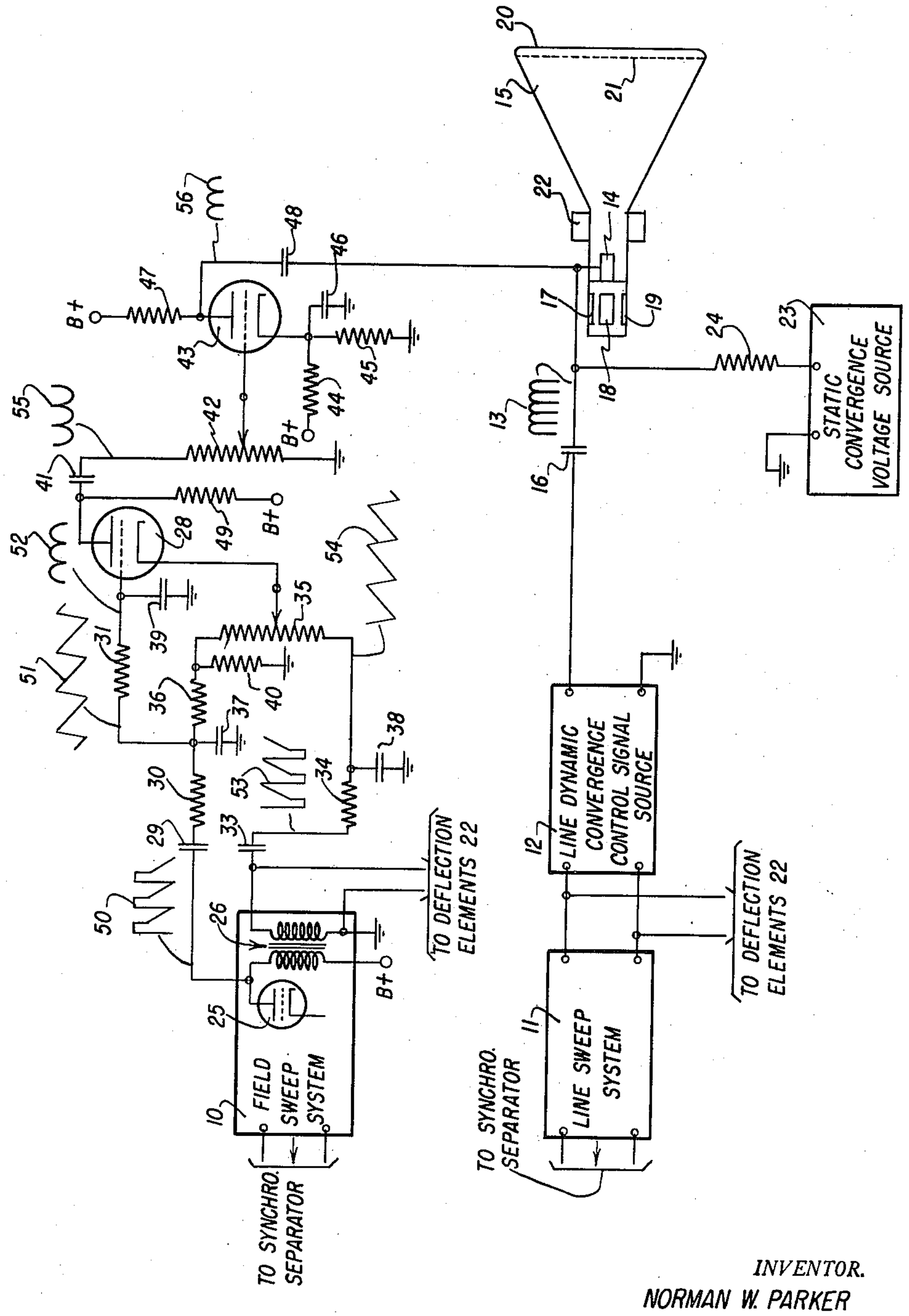
INVENTOR.
NORMAN W. PARKER
BY
Forman L. Mueller
ATTY.

United States Patent Office 2,759,121

Patented Aug. 14, 1956

2,759,121

TELEVISION RECEIVER

Norman W. Parker, Park Forest, Ill., assignor to Motorola, Inc., Chicago, Ill., a corporation of Illinois Application August 10, 1953, Serial No. 373,251

2 Claims. (Cl. 315—13)

This invention relates to cathode ray tube circuits and more particularly to an improved circuit for dynamically controlling the convergence and/or focus of the cathode ray beam or beams in the image reproducing device of a television receiver. The circuit may be used for dynamically controlling the convergence or focus of a plurality of beams in a color television system, or of a single beam in a monochrome television system.

It is usual in a present color television receiver to provide a cathode ray image reproducing tube in which, for example, three electron or cathode ray beams are developed, each representing a different primary color. These beams are directed to the screen of the cathode ray tube at different selected angles and each beam is scanned over different segments of the screen, these segments being treated to fluoresce in respective colors corresponding to the colors represented by the beams. To assure proper registry of the respective beams with the segments of the screen, an apertured plate or disc or other means such as a grid-like structure is usually mounted adjacent the screen and facing the beams. It is important for proper registry that the beams be controlled to converge in the plane of the apertured plate or grid structure for all positions of the beams as they are swept across the screen during the line and field scanning process of the receiver. For this reason, it has been found desirable to provide a dynamic convergence control in the receiver which exerts a varying control effect on the cathode ray beams and maintains the beams converged in the plane of the plate throughout the complete cycle of each of the line and field deflections. A convergence control circuit which produces a dynamic convergence control signal varying as a function of the line deflection signal is disclosed in copending application, Serial No. 281,178, filed April 8, 1952, in the name of the present inventor entitled "Color Television System" and assigned to the present assignee. In that application, an essentially parabolic signal is obtained by coupling a resonant network to the line deflection system of the cathode ray image reproducing tube. The resonant network is tuned to the frequency of the line deflection signal and is excited thereby to develop a sine wave which, during the line trace intervals has an essentially parabolic wave shape. This signal is then applied to an electrostatic convergence control element in the cathode ray tube and functions as a dynamic convergence control signal to maintain the beams converged in the plane of the apertured disc throughout the entirety of each line deflection cycle.

It is also desirable to develop in the receiver a field convergence control signal that varies as a function of the field deflection signal, and to utilize this latter control signal to maintain the beams in convergence throughout each field deflection cycle. Due to the fact that the field deflection of the beams is carried on at a much lower rate (for example, at 60 cycles as compared with 15,750 cycles for the line deflection) it is inappropriate to use tuned circuits for providing the dynamic convergence control signal for the field deflection. It is therefore necessary to use a different technique to produce this control signal in the receiver, and it is a general object of the present invention to provide a simple and relatively inexpensive network for deriving a dynamic convergence control signal from the field sweep system of a color television receiver and for utilizing this control signal to maintain the beams converged in the plane of the apertured disc throughout each field deflection cycle.

Another object of the invention is to provide an improved circuit for deriving a field dynamic convergence control signal from the field sweep system of a color television receiver which is constructed so that the wave shape of the convergent control signal can be manually adjusted to achieve a desired dynamic convergence control for the cathode ray beams in the image reproducing device during each cycle of the field deflection of such beams.

A more general object of the invention is to provide an improved circuit for developing a control signal from the low frequency field sweep system of a television receiver, which control signal is suitable for controlling the focus or convergence of the cathode ray beams in the reproducing device of a color television receiver or for controlling the focus of the cathode ray beam in the reproducing device of a monochrome television receiver, throughout each field deflection cycle of such beam or beams.

A feature of the invention is the provision of a simple resistance-capacity network that transforms the peaked sawtoothed field deflection signal developed in the field deflection system of a television receiver into a control signal for dynamically controlling the convergence or focus of the cathode ray beams in the image reproducing device of the receiver throughout each field deflection cycle.

Another feature of the invention is the provision of an improved resistance-capacity network for transforming the peaked sawtoothed deflection signal developed in the field sweep system of a television receiver into a control signal with an essentially parabolic wave shape for dynamic convergence of focus control, and which includes a balancing network for distorting the control signal so as to achieve the exact wave shape desired for satisfactory dynamic convergence control.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a portion of a color television receiver incorporating the improved field dynamic convergence control network of the present invention.

The circuit shown in the accompanying drawing includes a field sweep system 10 and line sweep system 11 of a color television receiver, the sweep systems being coupled in well known manner to the synchronizing signal separator of the receiver (not shown). Line sweep system 11 is coupled to the line deflection coils of the deflection elements of the image reproducing device of the receivers, and the sweep system is also connected to an appropriate line dynamic convergence control signal source 12 which may be similar to that disclosed in the copending application referred to previously herein. As previously mentioned, source 12 develops a dynamic convergence control signal 13, and this control signal is applied through a capacitor 16 to the convergence control electrode 14 of a cathode ray image reproducing device 15. Electrode 14 may be of any known construction and is usually in the form of a metal tube that sets up an electrostatic field when a potential difference is established between the electrode and guns 17, 18 and 19.

Reproducing device 15 may be of any well known form and includes, for example, three electron guns 17, 18 and 19. These guns develop three distinct cathode ray beams within the reproducing device, and the beams are directed to the fluorescent screen 20 of the device from different angles and through an aperture plate or disc 21 positioned adjacent the screen. The cathode ray beams from the electron guns are scanned over the fluorescent screen 20 by means of the usual deflection elements 22 including field deflection coils and line deflection coils. As previously noted, it is essential for proper registry of the beams on screen 20, that they be maintained in convergence in the plane of disc 21 throughout each line and field deflection cycle.

The receiver includes a static convergence voltage source 23 which supplies a static convergence voltage of, for example, 9 kilovolts to the convergence control electrode 14 through a resistor 24. The static convergence voltage establishes a potential difference between electrodes 14 and the electron guns 17, 18 and 19, and this establishes an electrostatic convergence field which is adjusted to converge the beams at the plate 21 for the reasons previously described. The line dynamic convergence signal from source 12 cooperates with the static convergence voltage to maintain the desired convergence of the beams throughout each line deflection cycle. In accordance with the present invention, the network to be described applies a second dynamic convergence signal to the electrode 14 which functions in conjunction with the line dynamic convergence signal and static convergence voltage further to maintain the beams in convergence throughout the entirety of each field deflection cycle.

Field sweep system 10 includes a final amplifier discharge device 25 whose anode is coupled to the positive terminal B+ through the primary winding of an output transformer 26. The secondary winding of transformer 26 is connected to the field coils of deflection elements 22 of the image reproducing device 15, one side of the secondary winding being returned to ground.

The top of the primary winding of transformer 26 is coupled to the control electrode of a mixing electron discharge device 28 through a capacitor 29 and a pair of series-connected resistors 30, 31. The top of the secondary winding of transformer 26 is coupled to the junction of resistors 30 and 31 through a coupling capacitor 33 and series-connected resistors 34, 35 and 36. The junction of resistors 30 and 36 is coupled to ground through a capacitor 37, the junction of resistors 34 and 35 is coupled to ground through a capacitor 38, the junction of resistor 31 and the control electrode of device 28 is coupled to ground through a capacitor 39, and the junction of resistors 35 and 36 is connected to ground through a resistor 40.

Resistor 35 has a movable tap thereupon which is connected to the emission electrode of discharge device 28. The anode of discharge device 28 is connected through a load resistor 49 to the positive terminal B+ and is coupled to ground through a capacitor 41 and series-connected resistor 42. Resistor 42 has a movable tap thereon which is connected to the control electrode of an amplifier discharge device 43. The cathode of discharge device 43 is connected to a positive potential point on a potentiometer formed by a pair of resistors 44, 45 connected between the positive terminal B+ and ground, resistor 45 being shunted by a capacitor 46. The anode of discharge device 43 is connected to the positive terminal B+ through a load resistor 47 and is coupled to the convergence control electrode 14 of device 15 through a coupling capacitor 48.

The primary winding of transformer 26 develops, in known manner, a peaked sawtooth wave 50 thereacross whose frequency corresponds to the field deflection frequency of the system. Resistor 30 and capacitor 37 constitute a first integrating network which transforms the peaked sawtooth wave 50 into an unpeaked sawtooth wave 51. Resistor 31 and capacitor 39 constitute a second integrating network for transforming the unpeaked sawtoothed waves 51 into an essentially parabolic wave 52 which is applied to the control electrode discharge device 28.

The secondary winding of transformer 26 develops a peaked sawtooth wave 53 of the same frequency as peaked sawtooth wave 50 but of reduced amplitude and 180° out of phase therewith. The resistor 34 and capacitor 38 constitute a third integrating network which transforms the peak sawtooth wave 53 into an unpeaked sawtooth wave 54. Sawtooth wave 54 is of the same frequency as sawtooth wave 51 but in phase opposition therewith.

The resistors 36 and 40 function as a potentiometer for reducing the amplitude of sawtooth wave 51 so that it approximates the amplitude of sawtooth wave 54. These sawtooth waves combine across resistor 35 and adjustment of the movable tap across the resistor supplies a sawtooth wave to the cathode of device 28 corresponding to the mixture of the two inversely phased waves 51 and 54. Therefore, by moving the tap across resistor 35, a sawtooth wave may be derived having a selected amplitude and corresponding in phase either to wave 51 or wave 54. At the same time, the integrating network 31, 39 applies the essentially parabolic wave 52 to the control electrode of discharge 28 and this latter wave is distorted to any desired degree by the resultant wave applied to the cathode of the device from the movable tap on resistor 35.

Discharge device 28 produces, therefore, a distorted amplified parabolic signal 55 and applies that signal to device 43 for further amplification and phase inversion so that the latter device applies an amplified distorted parabolic signal 56 to the convergence control electrode 14 of device 50. Signal 56 functions as the field dynamic convergence control signal for the receiver.

The distortion of the dynamic convergence control signal 56 applied to convergence control electrode 14 may be controlled by adjustment of the movable tap on potentiometer 35 to provide the proper convergence of the cathode ray beams in device 15 throughout the entirety of each field deflection of the beams. The amplitude of the parabolic signal 56 may be conveniently controlled by adjustment of the movable tap on resistor 42.

Although the present invention has been described in conjunction with a color television receiver as providing a dynamic convergence control for the cathode ray beams in the reproducing device, control signal 56 may be applied to a focusing electrode in the reproducing device of a color or monochrome television receiver to provide a dynamic focus control for the beams or beam therein.

The present invention provides, therefore, a relatively simple resistance capacity network that uses double integration and a balancing arrangement to transform the peaked sawtoothed field deflection signal developed in a television receiver into a suitable signal for dynamically controlling the convergence or focus of the cathode ray beams or beam in the reproducing device of the receiver.

While a particular embodiment of the invention has been shown and described, modifications may be made and it is intended in the appended claims to cover all such modifications as fall within the true spirit and scope of the invention.

I claim:

1. A color television receiver including in combination, a cathode ray image reproducing device having means for developing a plurality of cathode ray beams therein, and a deflection system coupled to said image reproducing device for controlling the deflection of the cathode ray beams and including an output transformer having a primary winding and a secondary winding, said windings developing a pair of oppositely phased peaked sawtooth waves, a circuit for controlling the convergence of the cathode ray beams in the reproducing device including in combination, resistance-capacity circuit means coupled to the primary winding of said output transformer for producing a first unpeaked sawtooth signal in response to one of the peaked sawtooth signals, resistance-capacity circuit means coupled to the secondary winding of said output transformer for producing in response to the other of the peaked sawtooth signals a second unpeaked sawtooth signal of inverted phase relative to the first unpeaked sawtooth signal, a resistance-capacity network for producing a control signal of essentially parabolic wave shape in response to the first unpeaked sawtooth signal, an adjustable circuit for mixing the first and second unpeaked sawtooth signals to produce a resultant sawtooth signal of selected amplitude and phase with respect thereto, circuit means including an electron discharge device for mixing the resultant sawtooth signal with the control signal to distort the control signal, and means for utilizing the distorted control signal to control the convergence of the cathode ray beams in the image reproducing device.

2. A color television receiver including in combination, a cathode ray image reproducing device having means for developing a plurality of cathode ray beams therein, and a deflection system coupled to said image reproducing device for controlling the deflection of the cathode ray beams including an output transformer having primary and secondary windings adapted to develop oppositely phased peaked sawtooth waves, a circuit for controlling the convergence of the cathode ray beams including in combination, first and second resistant-capacity networks respectively coupled to the primary and secondary windings of the output transformer for producing respective first and second unpeaked sawtooth signals in response to the packed sawtooth waves, a third resistant-capacity network coupled to one of the aforementioned networks for producing a control signal of essentially parabolic wave shape in response to an unpeaked sawtooth signal, adjustable means for mixing the first and second unpeaked sawtooth signals to produce a resultant signal of selected amplitude and phase with respect thereto, an electron discharge device coupled to said adjustable means and to said third resistance-capacity network for combining the resultant signal with the control signal to produce a control effect, and means coupled to said electron discharge device to apply said control effect to the cathode ray image reproducing device for controlling the convergence of the cathode ray beams therein.

References Cited in the file of this patent

UNITED STATES PATENTS

| | | |
|---|---|---|
| 2,140,284 | Farnsworth | Dec. 13, 1938 |
| 2,224,587 | Bahring | Dec. 10, 1940 |
| 2,449,524 | Witherby et al. | Sept. 14, 1948 |
| 2,613,333 | Bull | Oct. 7, 1952 |
| 2,664,521 | Schlesinger | Dec. 29, 1953 |
| 2,672,574 | Evans | Mar. 16, 1954 |
| 2,672,575 | Werenfels | Mar. 16, 1954 |

FOREIGN PATENTS

| | | |
|---|---|---|
| 503,462 | Belgium | Sept. 26, 1952 |

OTHER REFERENCES

Proceedings of the I. R. E., October 1951, pages 1249–1263, article by Albert W. Friend.